United States Patent
Berg et al.

(10) Patent No.: US 6,785,779 B2
(45) Date of Patent: Aug. 31, 2004

(54) MULTI-LEVEL CLASSIFICATION METHOD FOR TRANSACTION ADDRESS CONFLICTS FOR ENSURING EFFICIENT ORDERING IN A TWO-LEVEL SNOOPY CACHE ARCHITECTURE

(75) Inventors: Thomas B. Berg, Portland, OR (US); Stacey G. Lloyd, Manassas, VA (US)

(73) Assignee: International Business Machines Company, Armonk, NY (US)

( * ) Notice: Subject to any disclaimer, the term of this patent is extended or adjusted under 35 U.S.C. 154(b) by 214 days.

(21) Appl. No.: 10/045,821

(22) Filed: Jan. 9, 2002

(65) Prior Publication Data

US 2003/0131203 A1 Jul. 10, 2003

(51) Int. Cl.[7] ................................................ G06F 12/00
(52) U.S. Cl. ........................................ 711/146; 712/216
(58) Field of Search ....................... 711/133, 144–150; 712/216

(56) References Cited

U.S. PATENT DOCUMENTS

| | | | | |
|---|---|---|---|---|
| 5,434,993 A | * | 7/1995 | Liencres et al. ............. | 711/133 |
| 5,778,438 A | * | 7/1998 | Merchant ..................... | 711/146 |
| 5,881,262 A | * | 3/1999 | Abramson et al. .......... | 712/216 |
| 5,905,998 A | * | 5/1999 | Ebrahim et al. ............. | 711/144 |
| 6,078,983 A | * | 6/2000 | Hanawa et al. .............. | 710/240 |
| 6,260,117 B1 | * | 7/2001 | Freerksen et al. .......... | 711/146 |
| 6,516,393 B1 | * | 2/2003 | Fee et al. ..................... | 711/150 |
| 6,654,860 B1 | * | 11/2003 | Strongin et al. ............ | 711/154 |

* cited by examiner

Primary Examiner—Nasser Moazzami
(74) Attorney, Agent, or Firm—Law Offices of Michael Dryja

(57) ABSTRACT

A method of classification of transaction address conflicts in a computer system for ensuring efficient ordering in a two-level snoopy cache architecture. The disclosure provides a method of classification and handling of address conflicts within a system to minimize the impact that address ordering places in a multiprocessor system with multiple memory control agents generating potentially conflicting addresses. A set of classification for each potential transaction conflict is provided against which decisions are provided which identifies the earliest point at which a subsequent transaction within the system may proceed to the same address identified by a previous transaction in the system. Classification of transactions are provided in several high level classes which define how such transactions within the system are handled based on the method disclosed.

27 Claims, 7 Drawing Sheets

| Operation 1 | | | | |
|---|---|---|---|---|
| Source | Type | Snoop Result | Xbar 70 Reply | Xbar 70 Ack Cnt |
| Processor | BRL BRIL BIL BRP BWP BWL | Clean | Any | Any |
| | BRL BRIL BIL | HitM | GO | 0 |
| | BWP BRP BWL | HitM | GO | - |
| | BRL BRIL BIL | HitM | WAIT | 0 |
| | BRIL BIL | HitM | GO | >0 |
| | BRL BRIL BIL | HitM | WAIT | >0 |
| | BWB | N/A | N/A | N/A |
| | Any | Clean | RETRY | N/A |
| | Any | HitM | RETRY | N/A |

(Rows 1–3 bracketed as A; rows 4–9 bracketed as B; all rows bracketed as C)

FIG. 3A

| Operation 2 | | | | | | | |
|---|---|---|---|---|---|---|---|
| Processor | | PCI bus (F16) | | | | Xbar 70 | |
| BRL BRIL BIL BRP BWP BWL | BWB | Read w/ GoP7 | Write w/ GoP7 | Read w/ GoNoP 7WAIT WTGT WDAT | Write w/ GoNoP 7WAIT WTGT WDAT | LCR LCRI LUR LUW RUR RCI LRMW | LWB CI |
| Retried | N/A | IDS | IDS | IDS | IDS | IDS | IDS |
| Snp | N/A | Snp | Snp | Snp | Snp | Snp | Snp |
| NS | N/A | NS | NS | NS | NS | NS | NS |

FIG. 3B

| | | | | | | | |
|---|---|---|---|---|---|---|---|
| Data | N/A | Data | Data | Data | Data | Data | Data |
| Ack | N/A | Ack | Ack | Ack | Ack | Ack | Ack |
| Data + Ack | N/A | Data + Ack | Data + Ack | Data + Ack | Data + Ack | Data + Ack | Data + Ack |
| N/A | N/A | N/A | N/A | N/A | N/A | N/A | N/A |
| BDR Snp | N/A | BDR Snp | BDR Snp | BDR Snp | BDR Snp | BDR Snp | BDR Snp |
| Snp | N/A | Snp | Snp | Snp | Snp | Snp | Snp |

FIG. 3C

| | | | | | | | | |
|---|---|---|---|---|---|---|---|---|
| E | Snp | N/A | POS | POS | Snp | Snp | POS | Snp |
| | Data | N/A | Data | Data | Data | Data | Data | Data |
| | MOS | N/A | MOS | MOS | MOS | MOS | MOS | MOS |
| | Ack | N/A | Ack | Ack | Ack | Ack | Ack | Ack |
| | Snp | N/A | POS | POS | MOS | MOS | POS | MOS |
| | MOS | N/A | MOS | MOS | Ack | Ack | Ack | Ack |
| | Ack | N/A | Ack | Ack | Retried | Retried | Retried | Retried |
| | Retried | Retried | Retried | Retried | | | | |

MULTI-LEVEL CLASSIFICATION METHOD FOR TRANSACTION ADDRESS CONFLICTS FOR ENSURING EFFICIENT ORDERING IN A TWO-LEVEL SNOOPY CACHE ARCHITECTURE

CROSS-REFERENCE TO RELATED APPLICATIONS

The following patent applications, all assigned to the assignee of this application, describe related aspects of the arrangement and operation of multiprocessor computer systems according to this invention or its preferred embodiment.

U.S. patent application Ser. No. 10/045,798 by T. B. Berg et al. entitled "Method And Apparatus For Increasing Requestor Throughput By Using Data Available Withholding" was filed on Jan. 9, 2002.

U.S. patent application Ser. No. 10/045,927 by T. B. Berg et al. entitled "Method And Apparatus For Using Global Snooping To Provide Cache Coherence To Distributed Computer Nodes In A Single Coherent System" was filed on Jan. 9, 2002.

U.S. patent application Ser. No. 10/045,564 by S. G. Lloyd et al. entitled "Transaction Redirection Mechanism For Handling Late Specification Changes And Design Errors" was filed on Jan. 9, 2002.

U.S. patent application Ser. No. 10/045,797 by T. B. Berg et al. entitled "Method And Apparatus For Multi-path Data Storage And Retrieval" was filed on Jan. 9, 2002.

U.S. patent application Ser. No. 10/045,923 by W. A. Downer et al. entitled "Hardware Support For Partitioning A Multiprocessor System To Allow Distinct Operating Systems" was filed on Jan. 9, 2002.

U.S. patent application Ser. No. 10/045,925 by T. B. Berg et al. entitled "Distributed Allocation Of System Hardware Resources For Multiprocessor Systems" was filed on Jan. 9, 2002.

U.S. patent application Ser. No. 10/045,926 by W. A. Downer et al. entitled "Masterless Building Block Binding To Partitions" was filed on Jan. 9, 2002.

U.S. patent application Ser. No. 10/045,774 by W. A. Downer et al. entitled "Building Block Removal From Partitions" was filed on Jan. 9, 2002.

U.S. patent application Ser. No. 10/045,796 by W. A. Downer et al. entitled "Masterless Building Block Binding To Partitions Using Identifiers And Indicators" was filed on Jan. 9, 2002.

BACKGROUND OF THE INVENTION

Technical Field

The invention relates to a method of maintaining memory coherence and consistency in a computer system by classification of transaction address conflicts to improve efficiency in multi-node systems utilizing snoopy cache architecture.

BACKGROUND OF THE RELATED ART

Computer systems which utilize multiple microprocessors and distributed memory resources across two or more nodes in the system utilize snoopy cache-based systems to maintain transaction ordering throughout the system, including tracking location of data which may be stored on one or more nodes of the system. In such snoopy cache-based systems, the order in which data transactions are allowed to proceed through the system is essential in maintaining memory coherency and consistency across the system. The simplest form of maintaining such coherency and consistency is simply ensuring that no transactions in the system can pass each other so that proper data processing ordering is maintained That is, if a transaction in the system cannot be started until the previous trasaction is completed, this simple technique enforces this order requirement.

Other systems have increased efficiency by restricting the ordering of the timing of transactions to only transactions with the same address or address index so that they do not pass each other in the system when processing. One problem with maintaining data ordering is that whenever transactions block each other, the performance of the system is naturally degraded because of the delays inherent with the transaction which may be waiting to proceed.

In a two-level snoopy cache architecture in a multiprocessing system, the number of memory control devices or agents generating potentially conflicting addresses throughout the system is increased further, making efficient handling of the conflicts even more important. It is desirable, therefore, to enhance the address ordering flow by selection and implementation of an efficient set of ordering rules which prioritize or reorder potentially conflicting or actual conflicting addresses arising from ongoing system transactions such as to allow optimization of the system's capabilities and increase system speed by minimizing the impact of conflicting addresses issued by a memory control agent.

SUMMARY OF THE INVENTION

The invention is useful in multiprocessor computing systems having multiple, interconnected nodes, with each node having a local memory device and a processor device for accessing data from both the node's local memory device and the local memory device of another node.

A first aspect of the invention is a method for executing first-in-time and second-in-time transactions to be executed by the processors of such a system. The transactions are classified based at least in part on location of data to be accessed during their execution, and an execution dependency criterion is selected based on those classifications. Depending on the execution dependency criterion, the second in time transaction is deferred, and later released depending further on execution of the first in time transaction as it related to the criterion. The execution dependency criterion preferably releases the second in time transaction either: after the first in time transaction is placed in an ordered processor bus queue; after the first in time transaction is placed in an ordered memory queue; or after all dependencies of the first in time transaction are released.

Another aspect of the invention is an article such as a computer program product executable in a computer system as outlined above. The article comprises classifications of first-in-time and second-in-time transactions at least partly based on location of data to be accessed during execution of the transactions. The article also includes an execution dependency criterion based on the classifications, a deferral of the second-in-time transaction based on the criterion; and a release of the second-in-time transaction for execution at least partly based on the criterion and on execution of the first in time transaction.

Yet another aspect of the invention is in a multiprocessor computer system itself. The system includes multiple, interconnected nodes, each having at least one local memory device and at least one processor device capable of accessing data from both the local memory device of said node and the local memory device of another node. Classifications of first-in-time and second-in-time transactions in the system are based at least in part on location of data to be accessed during execution of the transaction. The system includes a deferred execution queue for the second-in-time transaction based on an execution dependency criterion which is based at least partly on the classifications. The system also includes a release of the second-in-time transaction for execution by a processor based at least in part on the criterion and on execution of the first in time transaction by the same or another processor. The system preferably further comprises a central hardware device interconnecting the nodes and storing information regarding location of data within the system, and both cache and main memory at each of the nodes.

Other features and advantages of the invention will become apparent from the following detailed description of its presently preferred embodiment, taken in conjunction with the accompanying drawings.

DETAILED DESCRIPTION OF THE PREFERRED EMBODIMENT

Overview

The present invention minimizes the impact that address ordering places in a multi-processor system with multiple memory control agents generating potentially conflicting addresses. The preferred embodiment provides a classification for each potential transaction conflict within the system. The classification identifies the earliest point at which a subsequent transaction to the same address or address index may proceed.

When the address of a transaction which is later in time (T2) conflicts with a previous data transaction earlier in time (T1), transaction T2 is placed in a strictly ordered queue and held there only until transaction T1 has progressed to the point required by the T1/T2 classification presented by the preferred embodiment Transaction T2 is then released from the queue and allowed to proceed.

The preferred embodiment classifies transactions into three high level classes. In the first class, transaction T1 must be placed in the ordered processor bus queue before transaction T2 can proceed. In the second class, transaction T1 must be placed in the ordered memory queue before transaction T2 can proceed. In the third class, transaction T1 must have all dependencies on that transaction T1 throughout the system released before transaction T2 can proceed in the system, wherein T1's dependencies include all data being received, all acknowledgments being received, ownership of the transaction space returned to the processor, and other such dependencies on transaction T1.

In the preferred embodiment, transactions T1 and T2 are identified by the access type such as a read, write, invalidate or other transaction, and also by snoop results of the system, cache tag (transaction identifiers) look-up results and acknowledgment requirements associated with the access. The transaction information is utilized to optimally classify a transaction conflict across the system. Accordingly, overall system performance is enhanced since the latency impact upon the second transaction T2 is minimized.

Technical Background

Figure 1:
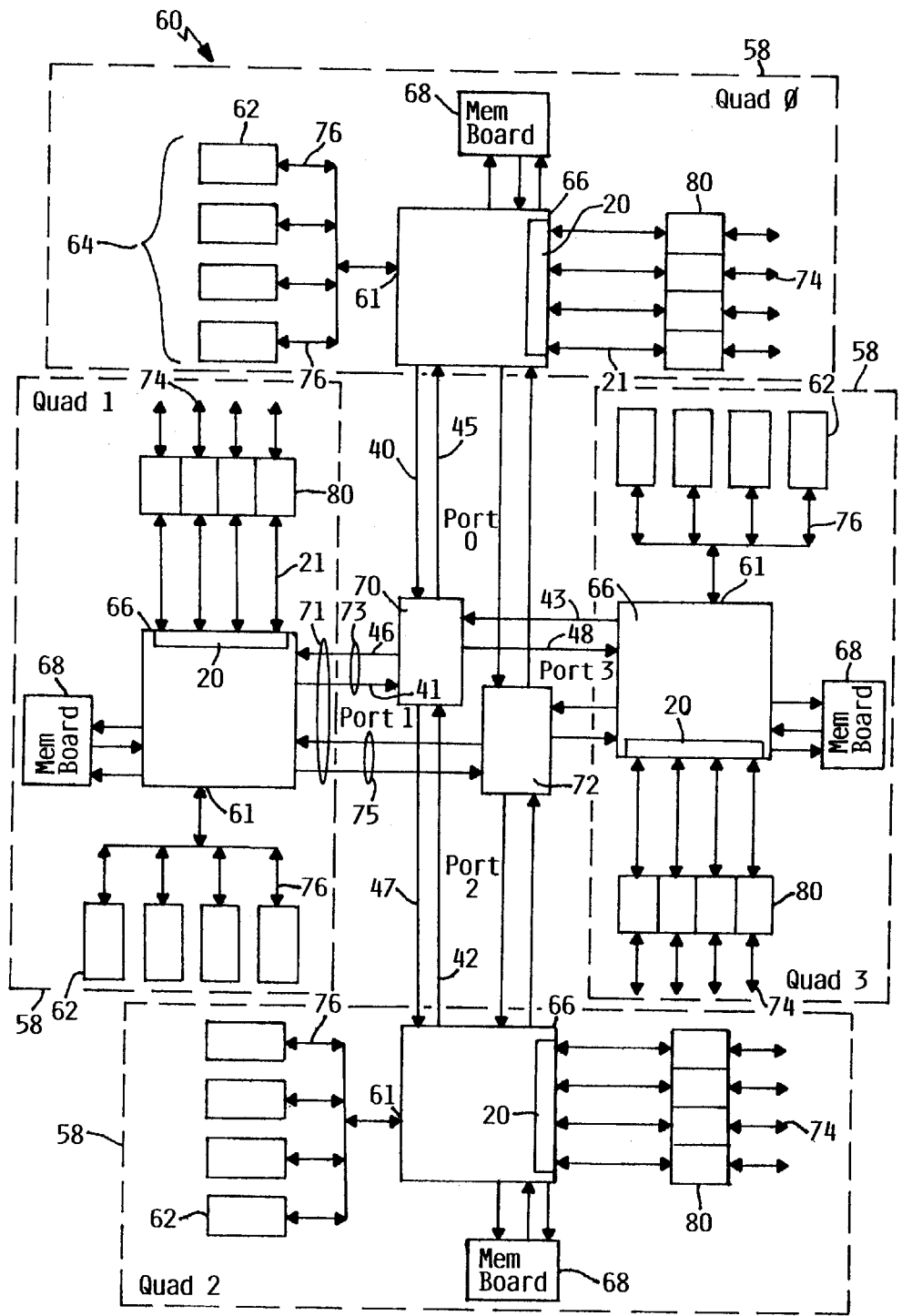
FIG. 1 is a block diagram of a typical multiprocessor system utilizing a tag and address crossbar system in conjunction with a data crossbar system with which the method of the preferred embodiment may be used.

FIG. 1 presents an example of a typical multiprocessor systems in which the present invention may be used. FIG. 1 illustrates a multi-processor system which utilizes four separate central control systems (control agents) 66, each of which provides input/output interfacing and memory control for an array 64 of four Intel brand Itanium class microprocessors 62 per control agent 66. In many applications, control agent 66 is an application specific integrated circuit (ASIC) which is developed for a particular system application to provide the interfacing for each microprocessors bus 76, each memory 68 associated with a given control agent 66, PCI interface bus 21, and PCI input/output interface 80, along with the associated PCI bus 74 which connects to various PCI devices. Bus 76 for each microprocessor is connected to control agent 66 through bus 61. Each PCI interface bus 21 is connected to each control agent 66 through PCI interface block bus 20.

FIG. 1 also illustrates the port connection between the tag and address crossbar 70 as well as data crossbar 72. In FIG. 1, a total of four ports are shown, being ports 0, 1, 2 and 3. As can be appreciated from the block diagram shown in FIG. 1, tag and address crossbar 70 and data crossbar 72 allow communications between each control agent 66, such that addressing information and memory line and write information can be communicated across the entire multiprocessor system 60. Such memory addressing system is necessary to communicate data locations across the system and facilitate update of control agent 66 cache information regarding data validity and required data location. FIG. 1 also shows bus 73 which interconnect tag and address crossbar 70 and control agent 66 associated with port 1. Bus 75 interconnects the data crossbar 72 to the same control agent 66 associated with port 1 of the system shown. Shown in FIG. 1 are the Input 40 for port 0, input 41 for port 1, input 42 for port 2, and input 43 for port 3 all of which comprise part of the communications pathway connections to each control agent 66 in each quad or node from tag and address crossbar 70. Also shown are each independent output of crossbar 70, which for each port are port 0 output 45, port 1 output 46, port 2 output 47 and port 3 output 48. It can be appreciated from FIG. 1 that each port connected to tag and address crossbar 70 is comprised of a bus similar to bus 73 shown in one instance as the connection path between tag and address crossbar 70 and control agent 66 for quad 1. In a similar fashion, input 40 and output 45 constitute a bus, input 43 and output 48 constitute a bus, and input 42 and output 47 constitute a bus for quad 0, quad 3 and quad 2, respectively. Though not separately labeled as a bus in FIG. 1, it should also be appreciated that data crossbar 72 has an input and output associated with each port connection. Each input and output pair connecting data crossbar 72 comprise a bus to each control agent 66 in each quad 58.

A single quad processor group 58 is comprised of microprocessors 62, memory 68, and control agent 66. In multiprocessor systems to which the present invention relates, quad memory 68 is usually random access memory (RAM) available to the local control agent 66 as local or home memory. A particular memory 68 is attached to a particular control agent 66 in the entire system 60, but is considered remote memory when accessed by another quadrant or control agent 66 not directly connected to a particular memory 68 associated with a particular control agent 66. A microprocessor 62 existing in any one quad processor group 58 may access memory 68 on any other quad processor group 58. NUMA systems typically partition memory 68 into local memory and remote memory for access by other quads, the present invention enhances the entire system's ability to keep track of data when such data may be utilized or stored in memory 68 which is located in a processor group 58 different from and therefore remote from, a processor group 58 which has a PCI device which may have issued the data.

The tag and address crossbar 70 and data crossbar 72 allow the interfaces between four memory control agents 66 to be interconnected as shared memory common operating system entities, or segregated into separate instances of shared memory operating system instances if the entire system is partitioned to allow for independently operating systems within the system disclosed in FIG. 1. The tag and address crossbar 70 supports such an architecture by providing the data address snoop function between the microprocessor bus 76 on different quads 58 that are in a common operating system instance (partition). In support of the snoop activity, the tag and address crossbar 70 routes requests and responses between the memory control agents 66 of the quads 58 in a partition. Each partition has its own distinct group of quads 58 and no quad can be a part of more than one partition. Quads of different partitions do not interact with each other's memory space. Therefore, it should be understood that the preferred embodiment will be described below with the assumption that all nodes in the system are operating within a single system partition. The method is fully capable of functioning within seperate partitions in such systems which are capable of partitioning system resources to operate independently as computer systems within a system.

Control agent 66 plays a central role in maintaining a fully coherent multi-processor system where all processors and input/output (I/O) devices must have a common view of the memory they share. When a processor or I/O device writes a new value to shared memory, control agent 66 and tag and address crossbar 70 collaborate to ensure that no other processor 62 or I/O device can ever read the memory's previous value. When a processor or I/O device reads shared memory the control agent 66 and tag and address crossbar 70 work together to supply the most up-to-date version of that data.

The processors on the same processor bus 76 generally maintain coherency among themselves. Processors 62 snoop the processor bus 76 and recognize accesses to lines held within their caches. Control agent 66 provides the necessary support such as snarfing cache-to-cache transfers (when appropriate), providing the proper response phase, and maintaining an out-of-order queue (OOQ). The OOQ is a list of the addresses of all outstanding processor-initiated cacheable memory transactions previously deferred by control agent 66. Control agent 66 defers most processor-initiated operations (also referred to herein as transactions). The only operations that are not deferred are those which are retried (due to an OOQ hit, PSAR hit, or resource limitation) and explicit and implicit writebacks (BWB). BWB's and transactions that receive a processor bus 76 signal asserted by a processor 62 to indicate that it has modified data in its cache for a processor bus 76 request that will provide the data (HitM), can not be retried Since a requesting processor does not assume ownership (i.e., transition its L2 cache state) of a deferred line until the deferred data is returned (i.e., the deferred phase), the control agent 66 must not allow subsequent processor-initiated operations to the same line. The control agent 66 provides a retry response to processor requests that hit a valid entry in the OOQ.

Control agent 66 and tag and address crossbar 70 are responsible for maintaining coherency among processors on different quads. When configured as a member of a multi-quad partition the control agent 66 maintains a 64 MB or 128 MB direct-mapped remote cache carved out of main memory. The remote cache portions of memory 68 holds remote lines previously accessed by a processor. The remote cache is fully inclusive of the processor's caches, i.e., all lines that are in a processor's cache are also in that quad's remote cache. Tag and address crossbar 70 maintains the address and state tags for each quad's remote cache. These tags are consulted for every cacheable memory operation.

For example, when a processor issues a read line (BRL) to remote shared memory, control agent 66 passes the request to tag and address crossbar 70, which looks up the state of the line in all quads' remote caches. If the requesting quad has a valid copy in its cache, tag and address crossbar 70 replies with a "GO", meaning the control agent 66 can return the data from the remote cache. If the requesting quad does not have a valid copy, tag and address crossbar 70 replies with "WAIT", and issues a command that reads the line from the current owner (i.e., a quad that has the line marked modified or the home quad). Tag and address crossbar 70 immediately updates its tags to indicate the requesting node has a shared copy and the control agent 66 installs the line in its remote cache and supplies it to the processor when the data arrives.

After the tag and address crossbar 70 looks up the state of a line, it determines the appropriate reply to be returned to the requesting quad and requests to be sent to the other quads (if required), acquires resources to complete those requests, and immediately transitions the tags to the new state. A subsequent access to the same line observes the updated state. Thus a control agent 66 may receive series of request and replies to the same cache line independent of the data flow.

For example, if a processor on quad 0 (being the quad connected to tag and address crossbar 70 through port 0) issues a BRL to a remote line not in the cache, tag and address crossbar 70 replies with a "WAIT", meaning quad 0 memory data is stale and the new data will arrive via the data crossbar 72 bus connected through port 0. If another processor on quad 1 immediately issues a read invalidate (BRIL) to the line, tag and address crossbar 70 will issue a remote cache invalidate (RCI) request to quad 0. The control agent 66 on quad 0 may receive the RCI before it receives the data for its BRL. However, the control agent 66 does not process the RCI until the data for the BRL has been returned to the processor. This is done because the processor does not transition its tags until it receives the data. If the control agent 66 would issue a cache invalidate (BIL) on the processor bus 76 prior to returning the BRL data, the requesting processor 62 would not perform the invalidate. Subsequently when the control agent 66 did return the BRL data, the processor would have stale data in its cache. The control agent 66 issues a stream of processor and PCI requests to tag and address crossbar 70 across its outbound bus, shown in one instance as bus 73 for the bus connected to control agent 66 in quad 1 through port 1.

The tag and address crossbar 70 issues a serialized order of requests (from other quads) and replies (to requests made by this quad) across each quad's bus connected to tag and address crossbar 70. Furthermore, tag and address crossbar 70 operates such that every control agent 66 involved in a transaction sees the same order. Tag and address crossbar 70 issues all of a transaction's reply and requests at the same time. When a transaction requires two transactions to the same quad they immediately follow one-another. Control agent 66 is responsible for following the order of transactions to the same line of memory as established by tag and address crossbar 70. The order is set by tag and address crossbar 70, not by the original order of requests issued by the control agent 66. Control agent 66 may deviate from tag and address crossbar 70 ordering when a processor 62 asserts HitM indicating an implicit writeback.

Control agent 66 follows tag and address crossbar 70 ordering by controlling the flow of addresses and data within control agent 66. Control agent 66 controls the flow of addresses onto processor bus, 76 (for tag and address crossbar 70 and PCI bus 74 requests that require a processor bus 76 snoop) and into the memory subsystem. The stream of addresses inside the control agent 66 flowing towards the processor bus 76 is called the processor bus 76 output stream (POS). Once an address is placed in the POS, it will be placed onto the processor bus 76, after some queueing delay.

Control agent 66 also produces an internal stream of requests called the memory order stream (MOS). The MOS is the series of committed reads and writes to a memory interface block (MIB). The MIB is a subsystem within control agent 66 that will maintain the order of operations to the same line as set by the MOS. For example, if the MOS has a write #1, read #1, write #2, read #2 to the same cache line, the MIB ensures that read #1 gets the data from write #1 and read #2 gets the data from write #2. The MOS is not necessarily the same as what is seen at the physical input of the control agent 66's memory buses because the MIB will reorder memory requests to different addresses to optimize any cache memory arrays used in implementation of a particular system utilizing the method disclosed. Control agent 66 follows the MOS order by controlling the flow of data. The method of controlling the flow of addresses into the POS and MOS to achieve the proper ordering in accordance with the preferred embodiment of the present invention will now be described.

Technical Details

Figure 2:
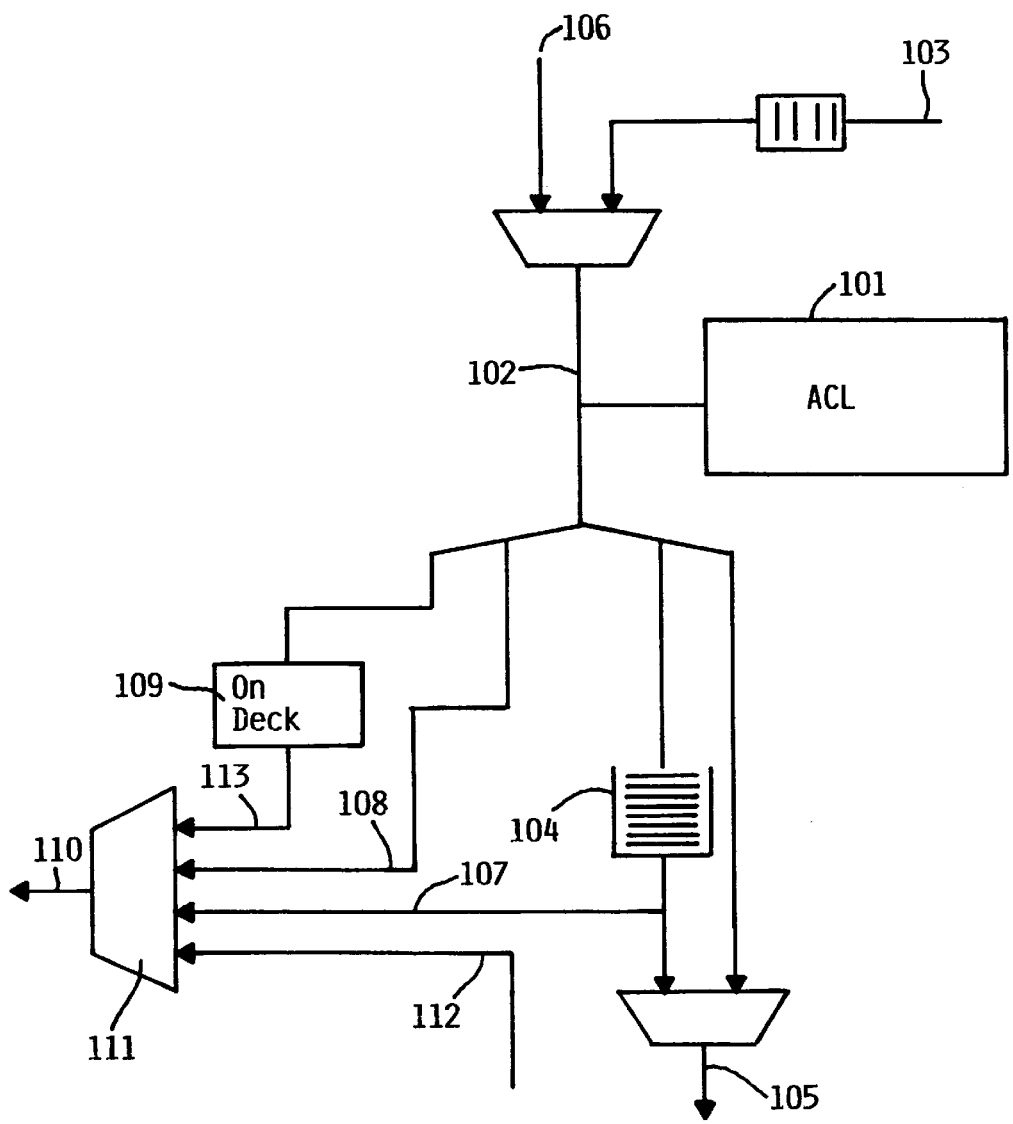
FIG. 2 is a logic diagram of the address ordering flow system used in the method of the preferred embodiment, and is suggested for printing on the first page of the issued patent.

The method of the preferred embodiment will now be described illustrating how the method is utlilized in the context of a multiprocessor system as described above. Turning to FIG. 2, disclosed therein is how MOS 110 and POS 105 are logically created from the stream 106 of requests and replies received from tag and address crossbar 70. Control agent 66 first determines if the transaction conflicts with a previously serialized transaction by comparing its address with those in the address conflict list 101 (ACL). ACL 101 contains addresses of requests and replies received from tag and address crossbar 70 that are still active in the control agent 66. A transaction enters the ACL 101 when tag and address crossbar 70 receives the request or reply from the tag and address crossbar 70. A conflict enable bit associated with the address in the ACL 101 indicates whether or not the address is still one that could have a conflict against it. Since there is the potential for a string of address conflicts, this conflict enable bit ripples to the tail of that string. Later operations are ordered behind the latest conflict on that address. For a given string of address conflicts only the last ACL entry in the string the has it's conflict enable set. This chaining effect is an important advantage provided by the preferred embodiment of the invention.

If there is no match in ACL 101, the transaction may be routed directly to the MOS 110 or POS 105. Transactions that require a processor bus 76 snoop are routed to the POS 105. They also go into MOS 110 after their snoop phase on the processor bus 76 via the higher priority snoop path 112. Transactions that do not require a processor bus 76 snoop are routed directly to MOS 110. There is an "on-deck" holding register 109 in case MOS mux 111 is being used by the higher priority snoop path 112. Since snoops can only occur once every three cycles of the system clock, a transaction will usually only stay in on-deck register 109 for one cycle. However it is possible that a transaction wants to enter MOS 110, but MOS mux 111 is being used by the snoop path 112 and on-deck register 109 is already full. In this rare case, the incoming transaction enters the TOQ 104 even though it does not have a conflict.

If there is a match in ACL 101, the transaction enters the transaction order queue 104 (TOQ). TOQ 104 is a first in, first out (FIFO) queue that maintains strict ordering, even among operations to different addresses. Once a transaction reaches the head of TOQ 104, it is popped off only after the transaction it was dependent upon has reached its "safe" state. Once popped off the TOQ 104, the transaction enters its target stream, i.e., MOS 110 or POS 105.

The TOQ 104 is also used to resolve some resource conflicts. For example, when control agent 66 receives a tag and address crossbar 70 request that requires a processor bus 76 operation, but the Processor Output Queue (POQ) to which POS 105 sends information is full, the transaction will be placed in TOQ 104 even though it has no conflict. When the transaction reaches, the head of TOQ 104 it waits for an open slot in the POQ at which point it proceeds from TOQ 104.

Table 1 shows the criteria that must be met before a transaction is allowed to enter MOS 110 or POS 105.

TABLE 1

MOS and POS Entrance Criteria

| Source | Operation Type | Snoop | POS 105 Entrance Criteria | MOS 110 Entrance Criteria |
|---|---|---|---|---|
| Processor (CPU) | Any except BWB | Clean | N/A | VXA Reply and Processor bus 76 Snoop and Dependency Release |
| | Any except BWB | HitM | N/A | Processor bus 76 Snoop If VXA reply is not GO w/ AckCnt = 0, transaction will enter MOS a 2nd time after Dependency Release. This is a crossing case. |
| | BWB | HitM | N/A | Processor bus 76 Snoop |
| Tag and address crossbar 70 | Any Except LWB, CI (Requires Processor bus 76 Operation) | Any | Dependency Release (or Dependency is in POS) | Processor bus 76 Snoop |
| | LWB, CI (Does not require Processor bus 76 Operation) | N/A | | Dependency Release |

TABLE 1-continued

MOS and POS Entrance Criteria

| Source | Operation Type | Snoop | POS 105 Entrance Criteria | MOS 110 Entrance Criteria |
|---|---|---|---|---|
| PCI Bus (Intel F16) | Read or Write w/ Tag and address crossbar 70 reply = GoP7 (Requires Processor bus 76 Operation) | Any | Dependency Release (or Dependency is in POS) | Processor bus 76 Snoop |
| | Read or Write w/ Tag and address crossbar 70 reply = GoNoP7 (Does not Requires Processor bus 76 Operation) | Any | | Dependency Release |

Most requests from a processor 62 that do not receive a HitM enter the MOS 110 only after tag and address crossbar 70 has sent a reply to control agent 66 and such reply has been received, its processor bus 76 snoop phase is complete, and it is not blocked by a conflicting operation, i.e., its dependency is cleared. This transaction can take one of three paths into MOS 110:

1. If the transaction hits ACL 101, it will enter the TOQ 104 and eventually enter the MOS 110 through MOS mux 111 input 107.
2. If the transaction does not hit ACL 101 and its snoop phase is complete when a tag and address crossbar 70 reply is received, it will enter input 108 of MOS input mux 111. If the MOS is busy the clue to a snoop at the higher priority snoop path 112, the transaction goes into the on-deck register 109. If the on-deck register 109 is full and MOS mux 111 is selecting snoop address input 112 the transaction enters TOQ 104, and eventually enters the MOS 110 through input 107 to MOS mux 111.
3. If the transaction does not hit ACL 101 and its snoop phase is not complete when the tag and address crossbar 70 reply is received, it uses mux input 112 when its snoop phase completes.

The second line in Table 1 shows that when a processor 62 initiated request receives a HitM it immediately enters MOS 110 via input 112 on MOS mux 111. Typically when a processor-initiated access receives a HitM the tag and address crossbar 70 replies with "GO", meaning the line is owned by this quad. However, it is possible that tag and address crossbar 70 had previously sent a request to that quad, but the control agent 66 placed it on the bus after the processor request. In this crossing case, the reply will be other than "GO". A processor 62 request always enters TOQ 104 and stays there until the crossing is cleaned up. Eventually the transaction enters MOS 110 a second time.

Processor BWBs enter MOS 110 after their snoop phase. Since these operations are not sent to the tag and address crossbar 70, a BWB can never be dependent upon a previous transaction.

Memory requests coming from tag and address crossbar 70 are divided into two categories. Those requests which require a processor bus 76 snoop and those which do not. Both types of transactions enter TOQ 104 if there is a hit or match in ACL 101. If there is no ACL 101 hit, transactions that do not require a processor bus 76 operation enter MOS 110 immediately. Operations that do require a processor bus 76 operation enter POS 105 then enter MOS 110 when its processor bus 76 snoop phase is complete. As an optimization, a transaction can be sent to POS 105 if the blocking transaction in front of it has also been issued to POS 105. Since the POS is processed in FIFO the overall order is maintained. Similarly, a transaction can be sent to MOS 110 if the blocking transaction in front of it has also been issued to MOS 110. Since the MOS is processed in FIFO the overall order is maintained.

PCI bus 74 initiated requests are similar to tag and address crossbar 70. They follow the same path depending if they require a processor bus 76 snoop or not as indicated by the tag and address crossbar 70 reply.

For a dependency described above to be released, certain conditions applicable to the relationship of the effected operations must be considered and related to the desired results in accordance with the method described. By way of example, assume tag and address crossbar 70 serializes two conflicting transactions or operations. Transaction one (T1), followed by transaction two (T2). T2 is therefore dependent upon T1. Utilizing the method of the preferred embodiment, when the dependency is released depends upon the nature of the T1 and T2 transactions (i.e. operations) themselves. A transaction may be more generally an operation within the system, and will be referred to below as an operation. An operation includes any reference to a transaction.

Figure 3D:
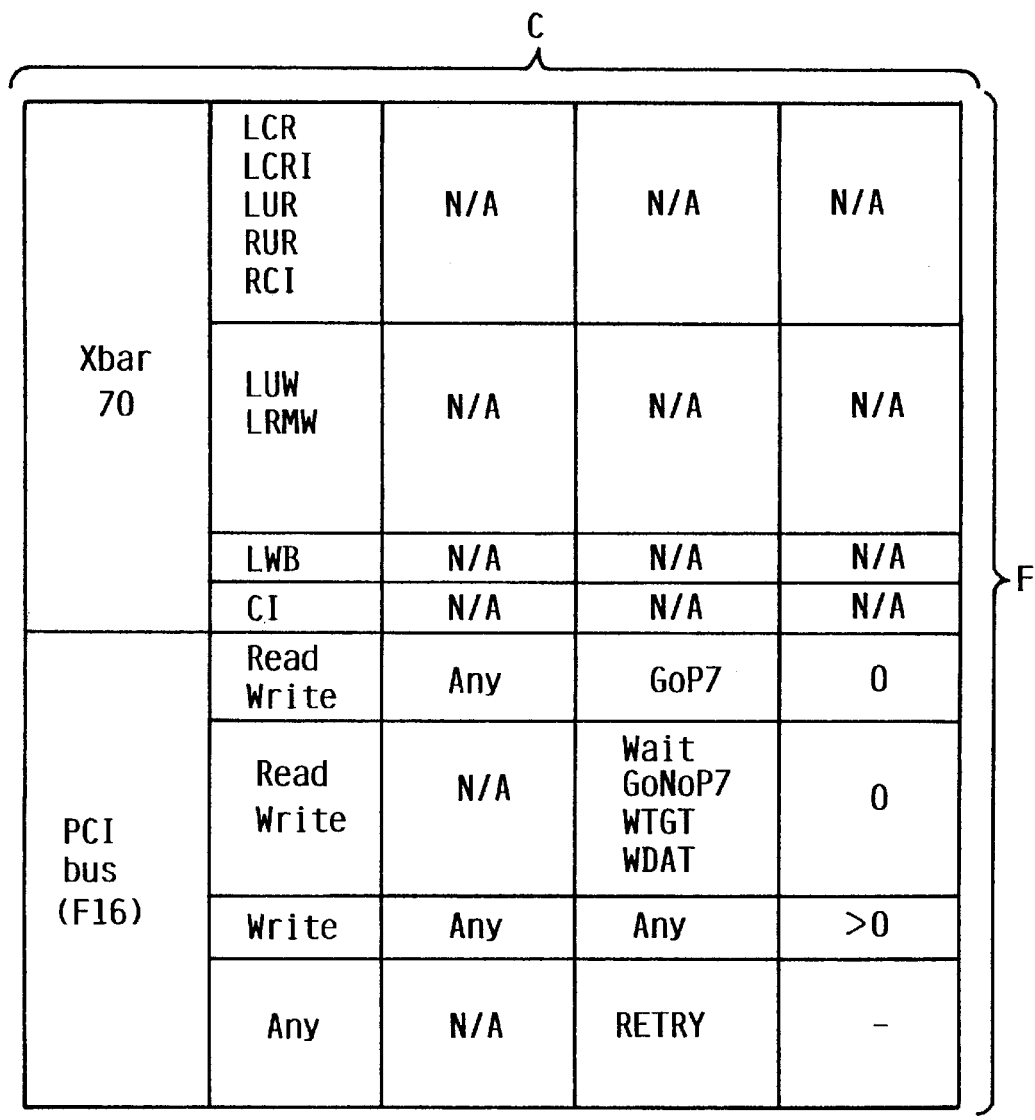
FIG. 3 is a table illustrating a dependency release matrix used in the method of the preferred embodiment.

FIG. 3 shows a matrix of when the dependency is released for each combination of operation 1 and 2 request types, tag and address crossbar 70 replies, and snoop phase results. Table 2 describes the meaning of each FIG. 3 table intersection entry. For ease of reference, Table 3 lists mnemonics used in FIG. 3 and Table 2.

TABLE 2

Dependency Release Matrix Decoder

| FIG. 3 entry | Means Operation 2 can proceed when: |
|---|---|
| Snp | Operation 1 has completed its snoop phase on the P7 Bus and has been entered MOS 111. |
| MOS | Operation 1 has entered MOS 111. No P7 Bus snoop was required by the Operation 1. |
| Ack | All the Acknowledges have been collected from other quads for Operation 1. |
| POS | Operation 1 has been placed in POS 105. This in is only used when Operation 1 and 2 both target POS 105. |
| Data | The data has been received from data crossbar 72 bus for Operation 1. This is specifically for the crossing case and an AckCnt of 0. |
| Data + Ack | The data and invalidate acknowledges have been received from a Data crossbar 72 bus for the Operation. |
| IDS | The deferred phase for Operation 1 has occurred on the Processor bus 76. IDS is the signal on the Processor bus 76 that indicates a deferred phase. This cannot occur for HitM cases since there is no IDS phase. |
| BDR Snp | The snoop phase of the deferred reply transaction (BDR) for Operation 1. A BDR is only issued to indicate a deferred reply of retry. |
| NS | Not Supported-Usually infers that attribute aliasing is not supported. |
| N/A | Not Applicable |

TABLE 3

Mnemonics

| Mnemonic | Description |
| --- | --- |
| BDR | Deferred reply transaction of retry |
| BIL | Invalidate line |
| BRIL | Read invalidate line |
| BRL | Read line |
| BRP | Read partial |
| BWB | Explicit writeback |
| BWL | Write line |
| BWP | Write partial |
| CI | Request to control agent 66 to collect invalidate acknowledges |
| GO | Reply to control agent 66 that data in that quad processor group 58 is up to date |
| GOnP7 | Reply to control agent 66 indicating that the write from a PCI device does not require a local processor bus snoop |
| HitM | Processor 62 signal that it has modified data in its cache for a processor bus 76 request that will provide the data. |
| IDS | Signal on processor bus 76 indicating the completion of a previously deferred transaction |
| LCR | Local cacheline read |
| LCRI | Local cacheline read invalidate |
| LRMW | Local read-modify-write |
| LUR | Local uncached read (either partial or full) |
| LUW | Local uncached write (either partial or full) |
| LWB | Local writeback-cacheline |
| MOS | Memory order stream 110 |
| NS | Not supported |
| POS | Processor bus 76 output stream 105 |
| RCI | Remote cache invalidate-RCRI request where all BE are zero and length is zero |
| RCR | Remote cacheline read |
| RCRI | Remote cacheline read invalidate |
| RETRY | Reply to control agent 66 that cancels the request. The request must be re-issued. |
| RUR | Remote uncached read (either partial or full line) |
| WAIT | Reply to control agent 66 indicating that data will be forthcoming from the data crossbar 72 |
| WDAT | Reply to control agent 66 for a partial write request indicating that data will be forthcoming from the data crossbar 72, merged with the partial write data, and then sent back to the home quad, returns target info |
| WTGT | Reply to control agent 66 for a full line write request indicating where the data should be sent |

The first line shows if Operation 1 is a processor 62 initiated BRL with a clean snoop, i.e., no HitM, then if Operation 2 is another processor 62 access to the same line, PCI bus 74 will hit the OOQ and will be retried. If Operation 2 is not a processor 62 access, i.e., a tag and address crossbar 70 or input/output initiated operation, it can not proceed until the deferred phase for Operation 1 has been initiated on the processor bus 76. The deferred phase occurs when the IDS signal is asserted on the processor bus 76. The reason operation 2 must wait until the deferred phase of operation 1 is because a processor 62 does not transition its L2 tags and release ownership until IDS for that transaction has been asserted. Operation 1's deferred phase does not occur until all of the following:

Operation 1 has entered the MOS 110, i.e., it has met its MOS 110 entrance criteria as shown in Table 1;

if operation 1 is a read the data from memory 68 or data crossbar 72 data must have been received; and all acknowledges (ACKs) from Invalidates sent to other quads due to operation 1 must be received.

The second line in FIG. 3 shows that when operation 1 receives a HitM and a tag and address crossbar 70 reply of GO w/Ack Cnt=0, operation 2 can proceed as soon as operation 1's snoop phase is complete. The Ack Cnt comes with the tag and address crossbar 70 reply. It indicates how many invalidate acknowledges to expect from data crossbar 72 (through bus 75, in the example of port 1). An Ack Cnt of zero indicates that there will no invalidate acknowledges for this transaction.

The next three cases demonstrate the crossing case where a processor 62 operation receives a snoop result of HitM, but tag and address crossbar 70 replies with WAIT and/or an non-zero Ack Cnt. In these cases, operation 2 is held up until the data crossbar 72 data and/or invalidate acknowledges are received for operation 1.

A BWB transaction can only occur if a quad 58 already owns the line so it does not require a tag and address crossbar 70 lookup and therefore does not lookup or enter ACL 101. A BWB is not dependent upon another operation nor can another operation be dependent upon a BWB. There are two cases involving a processor 62 access that receives a RETRY response from tag and address crossbar 70. If the operation receives a HitM, the transaction can be treated like; a HitM w/GO. If operation 1 receives a tag and address crossbar 70 RETRY and a clean processor bus 76 snoop, the control agent 66 must schedule a deferred reply transaction of retry (a BDR). A BDR is a full processor bus 76 operation, i.e., has an ADS, snoop phase, and response phase. In this case Operation 2 can not proceed until the snoop phase of operation 1's BDR. When Operation 1 is a read and/or invalidate initiated by tag and address crossbar 70 bus 73 and Operation 2 is going to POS 105, Operation 2 can go into POS 105 as soon as Operation 1 has entered POS 105. If Operaton 2 is not going to POS 105, i.e., it is going directly into MOS 110, then it must wait for Operation 1 to enter MOS 110, which occurs after its snoop phase.

Incoming requests LUW and LRMW operations require a reply to be issued to the data crossbar 72 after the transaction has been snooped on the processor bus 76. The LUW issues an ACK and the LRMW gives data to be merged at the requester. In these cases, the requesting quad 58 will collect all the invalidate ACKs, merge the data, if required, and forward data back to this quad. The home quad control agent 66 can not let a conflicting operation (i.e., Operation 2) proceed until the ACKs have been collected which is signaled by the receipt of data crossbar 72 data from the requester.

Tag and address crossbar 70 sends a local write back (LWB) command when modified data is being written back to the home node, e.g., a rollout (eviction) of modified data. The LWB does not enter POS 105 since a processor on that quad 58 can not have the data in its cache (the data was modified on another quad 58). If the LWB does not have any dependencies itself it can enter MOS 110, which in turn releases a subsequent transaction dependent upon it. Tag and address crossbar 70 sends a collect invalidate (CI) when a shared line is rolled-out (evicted) from another quad's remote cache. Control agent 66 receiving a CI protects the line (i.e., does not release its dependency on the line) until it has received a signal ACK from the quad whose line in being rolled-out. As FIG. 3 shows, the CI does not release a dependency until the ACK is received.

Address conflicts with transactions initiated by a PCI device are rare, but possible. In such cases if the request will be placed on the processor bus 76, i.e., when tag and address crossbar 70 reply is GoP7, it is treated similarly to tag and address crossbar 70 initiated operations that go to the processor bus 76. If the subsequent access, i.e., operation 2, is headed for POS 105 it may be released as soon as operation 1 (the PCI bus 74 request) is placed in POS 105.

PCI bus 74 reads and writes that do not require a snoop on its local processor bus 76, i.e., the tag and address crossbar 70 reply is not GoP7, and have an Ack Cnt=0, release their dependency when they enter MOS 110. If Ack Cnt is non-zero, then the dependency is released after the ACKs have been received.

With the above, a complete disclosure is provided for a method which provides for multi-level classification of computer system transaction or operation address conflicts related to address ordering, providing therefore a more efficient data flow and processing order in a two level snoopy cache architecture. The method has been demonstrated with details implementing the invention in a preferred embodiment It should be appreciated that with the method disclosed it is possible to obtain significant efficiencies by employing the invention in various types of computer processing systems. Further, the method is not necessarily limited to the specific number of processors or the array of processors disclosed, but may be used in any system design using interconnected memory control systems with tag and address crossbar and data crossbar systems to communicate between memory or system controllers to implement the present invention. Accordingly, the scope of the present invention fully encompasses other embodiments which may become apparent to those skilled in the art.

We claim:

1. A method of executing transactions in a multiprocessor system, the system having a plurality of interconnected nodes, each node having at least one local memory device and at least one processor device capable of accessing data from both the local memory device of said node and the local memory device of another node, the method comprising the steps of classifying a first in time transaction to be executed by one of the processors, said classification being based at least in part on location of data to be accessed during execution of the transaction;

classifying a second in time transaction to be executed by the same or another one of the processors, said classification being based at least in part on location of data to be accessed during execution of the transaction;

selecting an execution dependency criterion based on the classifications;

deferring the second in time transaction based on the criterion; and releasing the second in time transaction for execution based at least in part on the criterion and on execution of the first in time transaction, the second in time transaction released after the first in time transaction is placed in one of an ordered processor bus queue and an ordered memory queue, and before completion of the first in time transaction.

2. The method of claim 1, wherein releasing the second in time transaction comprises releasing the second in time transaction before the first in time transaction is placed in an ordered memory queue.

3. The method of claim 1, wherein releasing the second in time transaction comprises releasing the second in time transaction after a dependencies of the first in time transaction are released.

4. The method of claim 1, wherein the classification of the first in time transaction is further based on one or more factors selected from the group consisting of a source from which the transaction was initiated; and a type of transaction.

5. The method of claim 4, wherein the source is selected from the group consisting of one of the processors; the central hardware device; and an input/output bus.

6. The method of claim 4, wherein the nodes are interconnected by a central hardware device storing information regarding location of data within the system; and wherein the classification of the first in time transaction is further based on one or more factors selected from the group consisting of a result of a cache snoop;

a response of the central hardware device; and an acknowledgment count from the central hardware device.

7. The method of claim 6, wherein the source is selected from the group consisting of one of the processors; the central hardware device; and an input/output bus.

8. The method of claim 1, wherein the local memory device of each node is selected from the group consisting of a cache; a main memory of the node; and combinations thereof.

9. A method of classification of address conflicts between an operation occurring first in time and one or more operations occuring second in time, in a multiprocessor system having a plurality of nodes coupled by an interconnecting communications pathway comprised of a central hardware device which is capable of storing information regarding the location and state of data within the system, each node having at least one cache, a memory device local to the node and at least one processor device, the memory and processor device being coupled to form a complete subsystem, the processor device within each node being capable of accessing data from the local memory device, the local cache, or over the interconnecting communications pathway from a non local memory device, or a non local cache, the method including the steps of classification of a first in time operation;

classification of a second in time operation;

comparing the classification of said first operation with said second operation;

selecting a dependency criteria from a dependency release table based on said classification of said first and said second operation; and releasing said second operation based on said above release criteria, wherein said dependency release criteria is comprised of:

a first class wherein the said first operation is placed in an ordered processor bus queue before the said second operation can proceed;

a second class wherein said first operation is placed in an ordered memory queue before said second operation can proceed; and a third class wherein said first operation must have all required dependencies on that transaction released before said second operation can proceed in the system.

10. The method of claim 9 wherein the classification of said first operation is dependent from one or more of a source from which said operation was initiated, the type of operation, the results of the system's snoop cache, a response of said central hardware device, and an acknowledgment count from said central hardware device.

11. The method of claim 10 wherein said second operation is classified in accordance to the source of said operation and the type of said operation.

12. The method of claim 11 wherein said source criteria is comprised of the processor, the central hardware device, or input/output bus.

13. In a multiprocessor system having a plurality of nodes coupled by an interconnecting communications pathway comprised of a central hardware device which is capable of storing information regarding the location and state of data within the system, each node having at least one cache, a memory device local to the node and at least one processor device, the memory and processor device being coupled to form a complete subsystem, the processor device within each node being capable of accessing data from the local memory device, the local cache, or over the interconnecting communications pathway from a non local memory device, or a non local cache, wherein such system classifies transactions within the system in part in accordance with the address of the transaction, and one or more transactions occurring later in time may conflict with an address of with a transaction previous in time, a method of handling conflicts between such transactions including the steps of placing conflicting transactions later in time a ordering queue;

holding said conflicting transactions in said ordering queue until any first in tune transactions with which said conflicting transactions conflict have progressed to a point defined by a predetermined classification of the relationship between said first in time and said second in time transactions; and releasing said second in time transactions from said ordering queue, wherein said predetermined, classification includes:

a first class wherein said first in time transaction is placed in an ordered processor bus of said at least one processor device;

a second class wherein said first in time transaction is placed in an ordered memory queue; and a third class wherein said first in time transaction has all required dependencies on that transaction throughout the system released before any conflicting second in time transaction can proceed in the system.

14. The method of claim 13 wherein said first in time transaction is placed in said ordered memory queue before any said second in time transactions can proceed.

15. The method of claim 14 wherein said required dependencies in said third class are selected from the group consisting of all required data being received, all required acknowledgments being received, ownership of the transaction space being returned to a processor, and combinations thereof.

16. The method of claim 15 wherein said first in time and said second in time transactions are further classified in accordance with the access type, by snoop results of the system, transaction identifiers, look up results and acknowledgment requirements associated with the access.

17. An article executable in a multiprocessor system, the system having a plurality of interconnected nodes, each node having at least one local memory device and at least one processor device capable of accessing data from both the local memory device of said node and the local memory device of another node, the article comprising:

a classification of a first in time transaction to be executed by one of the processors, said classification being based at least in part on location of data to be accessed during execution of the transaction;

a classification of a second in time transaction to be executed by the same or another one of the processors, said classification being based at least in part on location of data to be accessed during execution of the transaction;

an execution dependency criterion based on the classifications;

a deferral of the second in time transaction based on the criterion; and a release of the second in time transaction for execution based at least in part on the criterion and on execution of the first in time transaction, wherein the classification of the first in time transaction is further based on one or more factors selected from the group consisting of a source from which the transaction was initiated, and a type of transaction, wherein the nodes are interconnected by a central hardware device storing information regarding location of data within the system, and wherein the classification of the first in time transaction is further based on one or more factors selected from the group consisting of: a result of a cache snoop; a response of the central hardware device; and whether the central hardware device requires an acknowledgment.

18. The article of claim 17, wherein the release is responsive to placement of the first in time transaction in an ordered processor bus queue notwithstanding whether all dependencies of the first in time transaction have been released.

19. The article of claim 18, wherein the release is further notwithstanding whether the first in time transaction has been placed in an ordered memory queue.

20. The article of claim 17, wherein the release is responsive to placement of the first in time transaction in an ordered memory queue notwithstanding whether all dependencies of the first in time transaction are released.

21. The article of claim 17, wherein the release is responsive to release of all required dependencies of the first in time transaction.

22. The article of claim 17, wherein the source is selected from the group consisting of one of the processors; the central hardware device; and an input/output bus.

23. The article of claim 17, wherein the local memory device of each node is selected from the group consisting of a cache; a main memory of the node; and combinations thereof.

24. A computer system comprising:

a plurality of interconnected nodes, each node having at least one local memory device and at least one processor device capable of accessing data from both the local memory device of said node and the local memory device of another node;

a classification of a first in time transaction to be executed by one of the processors, said classification being based at least in part on location of data to be accessed during execution of the transaction;

a classification of a second in time transaction to be executed by the same or another one of the processors, said classification being based at least in part on location of data to be accessed during execution of the transaction; an execution dependency criterion based on the classifications;

a deferred execution queue for the second in time transaction based on the criterion, and a release of the second in time transaction for execution based at least in part on the criterion and on execution of the first in time transaction, wherein the execution dependency criterion comprises a criterion selected from the group consisting of placement of the first in time transaction in an ordered processor bus queue; placement of the first in time transaction in an ordered memory queue; and release of all required dependencies of the first in time transaction.

25. The system of claim 24, further comprising a central hardware device interconnecting the nodes and storing information regarding location of data within the system; and
   wherein the classification of the first in time transaction is further based on one or more factors selected in the group consisting of:
   a source from which the transaction was initiated, and a type of transaction; a result of a cache snoop; a response of the central hardware device; and whether the central hardware device has presented an acknowledgment.

26. The system of claim 25, wherein the source is selected from the group consisting of one of the processors; the central hardware device; and an input/output bus.

27. The method of claim 24, wherein the local memory device of each node is selected from the group consisting of a cache; a main memory of the node; and combinations thereof.

* * * * *